UNITED STATES PATENT OFFICE.

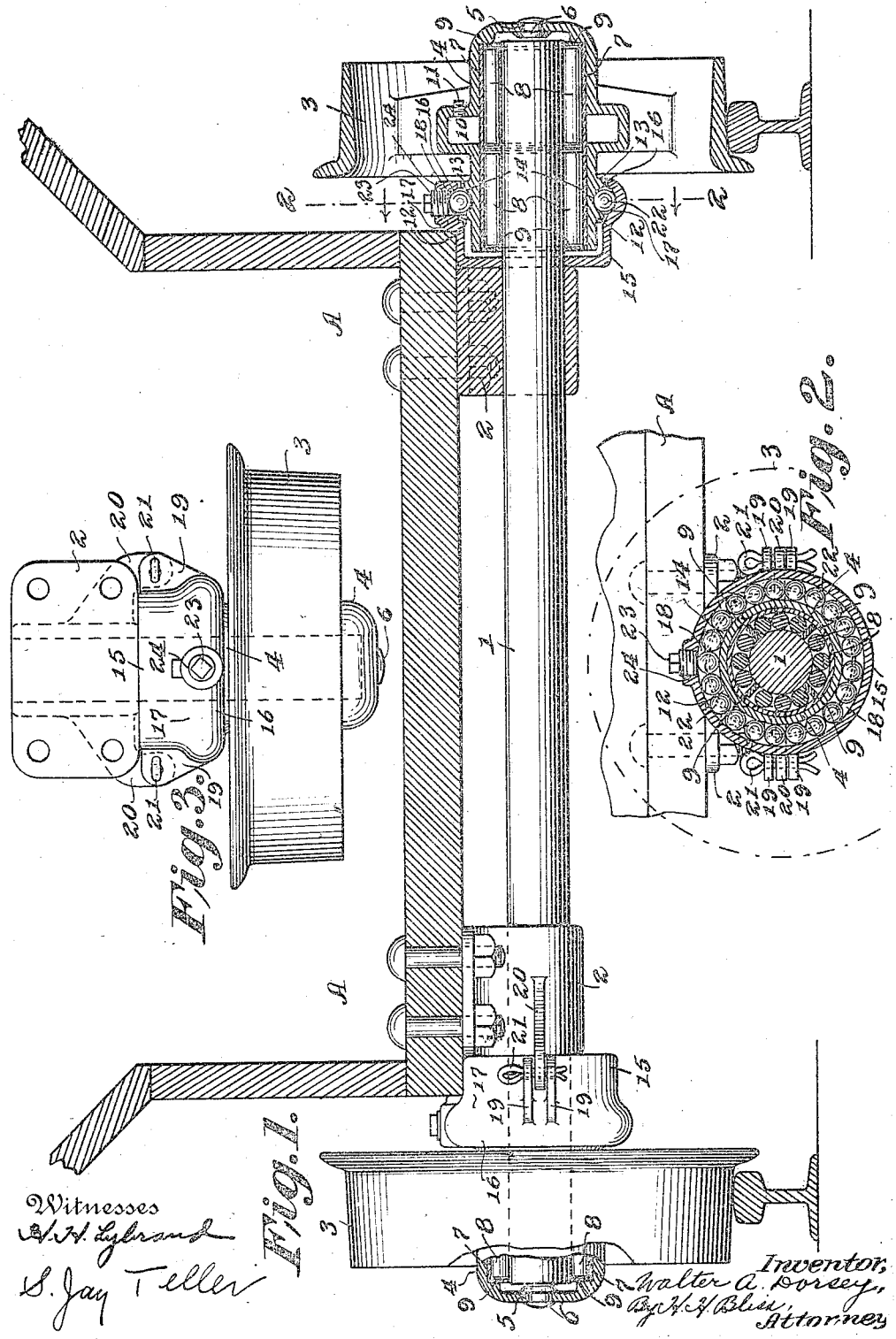

WALTER A. DORSEY, OF COLUMBUS, OHIO, ASSIGNOR TO THE BONNEY-FLOYD COMPANY, OF COLUMBUS, OHIO, A CORPORATION OF OHIO.

CAR-WHEEL CONSTRUCTION.

1,142,315.  Specification of Letters Patent.  Patented June 8, 1915.

Application filed October 21, 1914. Serial No. 867,862.

*To all whom it may concern:*

Be it known that I, WALTER A. DORSEY, a citizen of the United States, residing at Columbus, in the county of Franklin and State of Ohio, have invented certain new and useful Improvements in Car-Wheel Construction, of which the following is a specification, reference being had therein to the accompanying drawing.

This invention relates to improvements in wheels and wheel mountings of the class commonly used in track-guided cars, particularly cars of the sort used in and about mines.

The object of the invention is to provide a simple construction of wheel and wheel-mounting having a minimum number of parts which can be readily assembled or separated, and which shall include anti-friction devices so arranged in respect to the rotary and the non-rotary parts that they will prevent displacement of the wheel, beyond predetermined limits, axially of the axle.

Another object is to provide an anti-friction holder or lock which will not only take the axial thrusts of, or upon, the wheel in both directions, but which will permit quick and ready detaching of the wheel from the car without requiring the disassembling of any of the smaller parts.

In the drawings, Figure 1 is a view taken transversely of a car, the car body and one of the wheels being shown in section, and other parts shown in elevation; Fig. 2 is a vertical section on the line 2—2 of Fig. 1; Fig. 3 shows detached the wheel and the devices which hold it in place and take its thrust.

Referring to the drawings, A represents, as a whole, the car body, which can be of any usual construction. It is shown formed of wood.

1 is one of the axles which is preferably simply a straight piece of shafting. The body A is supported on the axle by means of the bearing boxes 2. These are adapted to permit the axle to move therein either longitudinally or rotatively, but it will be understood that the axle will ordinarily be stationary with the wheels rotating upon it in the manner to be described. As the wheels and wheel mountings at the two ends of the axle are similar to each other, it will be sufficient to describe one of them in detail.

3 represents the outer part of the wheel which is formed with the usual tread, flange and spokes. It has a large hollow hub 4 which is open at its inner end and closed at its outer end. Preferably the outer closed end of the hub is initially formed with an opening at 4 which is closed by means of a rivet 6. The head of this rivet projects inward and is adapted to engage the end of the axle to limit longitudinal movement thereof.

Fitted within the bore of the hub 4 is a bushing sleeve 7 and, in the preferred form, bearing rollers 8 are interposed between the bushing 7 and the axle. As shown, there are two series of rollers placed end to end. The rollers of each series are held in place and controlled by means of a suitable cage 9. The hub 4 is formed at 10 with a recess which can be fitted with lubricant, preferably in solid or semi-solid form. Lubricant can be supplied to this recess through an opening such as shown, closed by the plug 11. Formed upon the periphery of the inner part of the hub are outward projecting circumferential flanges 12 and 13 between which there lies the inner part 14 of a two-part ball race.

15 is a shell-like sleeve or ring surrounding the inner end of the hub 4. It is provided with inward projecting circumferential flanges 16 and 17 between which lies the outer part 18 of the aforesaid two-part ball race. The sleeve or ring 15 is secured to the body of the car, preferably by means of the bearing box 2. It is readily detachable therefrom, being provided on each side with pairs of ears 19, 19 which embrace an ear 20 on the bearing box. Cotter pins 21 extend through suitable apertures in the ears 19, 19 and 20, and hold the sleeve 15 in place. The latter is provided at its upper part with an aperture 24 through which balls 22 can be inserted to fill the annular space between the two parts 14 and 18 of the ball race and through which they can also be withdrawn. This aperture for the insertion and withdrawal of the balls is closed by means of the plug 23.

It will be seen that the balls 22 serve to prevent longitudinal movement of the wheel in either direction, the balls themselves taking the thrust and preventing all friction except their own rolling friction. The wheel can be removed from the axle at any time by simply removing the cotter pin 21 and sliding it longitudinally, the sleeve 15 moving with it. The axle itself can be readily removed after the removal of the wheels simply by sliding it longitudinally. When the parts are all assembled the axle is held against longitudinal movement, as aforesaid, by the rivets 6. I am aware of the fact that it has been proposed to provide wheels of this character with a series of balls arranged in radial planes; but in the earlier constructions the second or outer element of the ball race was provided by mechanism supplemental to the rotary wheel hub and supplemental to the surrounding stationary shell-like sleeve or ring, this supplemental mechanism requiring that it should be keyed in position in the outer sleeve so as to provide an abutment for the balls. In my construction all of these supplemental parts are dispensed with. The ball race or chamber is formed in two simple parts, one integral with the hub, and the other integral with the surrounding sleeve. The balls themselves directly contact with and engage the metal of the sleeve and the metal of the hub. The groove in the hub is approximately semi-circular in section at any radial plane and the opposite part of the groove in the stationary surrounding sleeve is also approximately semi-circular.

The wheel hub can be inserted longitudinally directly into the surrounding sleeve or shell until the two halves of the ball race register, and then the balls can be readily inserted through the aperture at 24. And when it is desired to separate the hub from the sleeve or shell the latter can be first detached from the body or from the bearing at 2, slid longitudinally and then turned around the axis until the aperture 24 is on the underside, whereupon the balls will escape from their raceway and the hub and sleeve can be separated. When it is desired to merely separate the wheel from the car, all that is required, as above described, is the detaching of the cotters at 21 from the web or ear 20.

I am aware that it has been heretofore proposed to construct a mechanism, for mounting and holding a wheel, having a stationary sleeve of short radius provided with an external ball groove, an axle rotating in and projecting from the end of said sleeve, a wheel with a hub having an inner end of a transverse dimension of a long radius fitted over the end of the sleeve and adapted to engage with the balls in the groove. The present design is aimed to overcome the difficulties experienced in using constructions such as described and heretofore proposed. In the present case the varying balls and two companion parts, which provide the bearing and holder for them, are detachable as a unitary structure. The sleeve or ring 15 is detachable immediately from the bearing and from the car body, and, if at any time it is found necessary to separate the sleeve or ring from the hub, it can be done by releasing the cotter pins, and rotating it around the wheel until the ball passage at 24 is below the axle, for then the balls will readily escape and the sleeve or ring can be moved from the hub.

What I claim is:

1. The combination of the body, the axle, the bearing for the axle, the wheel having a hub extending inward toward the bearing, the sleeve or ring surrounding the hub and detachably connected to the bearing and the body, the series of balls outside of the hub and within said sleeve or ring and arranged to lock them together, substantially as set forth.

2. The combination of the body, the axle, the bearing, the wheel having a hub extending in toward the bearing, the sleeve or ring surrounding the wheel hub and detachably connected to the bearing and to the body, and the series of balls outside of the wheel hub and inside of the sleeve or ring, and detachable, while in operative position, with the wheel, from the bearing and from the axle.

3. The combination of the body, the axle, the bearing, the wheel, the hub extending inward from the wheel toward the axle, the series of balls engaging axially with the hub, and the sleeve or ring outside of the balls and engaging axially therewith, said hub, balls and sleeve being detachable while in working positions, relatively to each other, from the bearing and the body.

4. The combination of the body, the bearing, the axle, the wheel having an inwardly projecting hub provided with outwardly extended ball race flanges, the sleeve or ring surrounding the balls and provided with inward extended ball race flanges, the series of balls in the race arranged to lock together the sleeve and the hub, and holding devices for the sleeve adapted to hold it stationary relatively to the body or at option to permit its separation therefrom independently of the bearing.

5. The combination of the body, the bearing, the axle, the wheel having a hub extending inward toward the bearing, the series of balls engaging axially with the hub, the sleeve or ring extending integrally around the hub and around said balls and engaging axially therewith, and means for holding said sleeve stationary relatively to the body or, at option, permitting it to be separated from the wheel independently of the bearing.

6. The combination of the bearing, the axle, the wheel having a hub extending toward the bearing, the series of balls, the sleeve or ring provided with a ball passage, and the sleeve and the hub being constructed to provide a race for the balls communicating with said passage, and means for optionally locking said sleeve against rotation or releasing it to permit its rotation.

In testimony whereof, I affix my signature, in presence of two witnesses.

WALTER A. DORSEY.

Witnesses:
HARRY S. RANSOM,
WM. P. CALEY.